(12) United States Patent
Defever et al.

(10) Patent No.: US 7,618,147 B2
(45) Date of Patent: Nov. 17, 2009

(54) EFFICIENT ILLUMINATION FOR DISPLAY SYSTEMS AND IN METHODS FOR DISPLAYING

(75) Inventors: Rik Defever, Kuurne (BE); Bart Maximus, Oudenaarde (BE)

(73) Assignee: Barco N.V., Kortrijk (BE)

( * ) Notice: Subject to any disclaimer, the term of this patent is extended or adjusted under 35 U.S.C. 154(b) by 483 days.

(21) Appl. No.: 11/289,282

(22) Filed: Nov. 30, 2005

(65) Prior Publication Data

US 2006/0132910 A1 Jun. 22, 2006

Related U.S. Application Data (60) Provisional application No. 60/631,430, filed on Nov. 30, 2004.

(51) Int. Cl.
| | |
|---|---|
| G03B 21/20 | (2006.01) |
| G03B 21/28 | (2006.01) |
| G03B 21/26 | (2006.01) |
| G02B 6/10 | (2006.01) |
| G02B 6/32 | (2006.01) |
| F21V 7/04 | (2006.01) |
| G03H 1/00 | (2006.01) |

(52) U.S. Cl. .................. 353/102; 353/98; 353/94; 353/121; 385/129; 385/34; 362/610; 362/612; 362/555; 359/34
(58) Field of Classification Search ............ 353/102, 353/98, 94, 121; 385/129, 34, 132; 362/610, 362/551, 612, 555; 359/34
See application file for complete search history.

(56) References Cited

U.S. PATENT DOCUMENTS

| | | | |
|---|---|---|---|
| 6,038,005 | A | 3/2000 | Handschy et al. |
| 6,220,714 | B1 | 4/2001 | Eguchi |
| 7,445,340 | B2 * | 11/2008 | Conner et al. ............. 353/20 |
| 2001/0048493 | A1 | 12/2001 | Swanson et al. |
| 2004/0263500 | A1 | 12/2004 | Sakata |
| 2006/0044523 | A1 * | 3/2006 | Teijido et al. ............. 353/53 |

FOREIGN PATENT DOCUMENTS

| | | |
|---|---|---|
| CN | 1540394 | 10/2004 |
| EP | 0 985 952 | 3/2000 |
| WO | WO 2004/043076 | 5/2004 |

* cited by examiner

*Primary Examiner*—Diane I Lee
*Assistant Examiner*—Magda Cruz
(74) *Attorney, Agent, or Firm*—Bacon & Thomas, PLLC (57) ABSTRACT

A display system (100, 200, 300, 350, 400, 450) for displaying an image is described. The display system (100, 200, 300, 350, 400, 450) typically comprises one or a plurality of individual light sources (102) and a light collecting stage (110, 210, 310, 410) which comprises a separate light collecting sub-system associated with each light source (102), or group of light sources (102). The display system (100, 200, 300, 350, 400, 450) typically comprises at least one light modulator (120) which is operable to modulate light received from the light collecting stage (110, 210, 310, 410) according to an image which is to be displayed. Finally a projection stage (130) is provided for projecting the image, typically on a projection screen. The present invention also relates to a corresponding method. The present invention is especially useful with light sources having a packaging around the light emitting surface such that the light sources cannot be physically placed adjacent to each other.

15 Claims, 4 Drawing Sheets

EFFICIENT ILLUMINATION FOR DISPLAY SYSTEMS AND IN METHODS FOR DISPLAYING

TECHNICAL FIELD OF THE INVENTION

The present invention relates to a display system for displaying images. More particularly, the present invention relates to illumination in systems and methods for displaying images, such as e.g. projection systems and methods for projecting.

BACKGROUND OF THE INVENTION

Lighting systems and display systems, such as projection systems, are used for various applications such as for example for displaying images, in watches, in calculators, in computerised systems, in simulation systems and for projecting information or images onto a distant screen. Most projection systems basically comprise a lamp for generating light, illumination optics for capturing that light and transferring it to one or a plurality of light modulators and a projection lens which images the illuminated light modulator on a screen.

Light emitting diode (LED) devices are being increasingly used in projection and lighting applications. They have advantages of a long operational life, low operating power and low emitted heat. A disadvantage of LED devices is that an individual device emits a relatively low level of light. For an efficient projector system comprising such an illumination source it therefore is important to transfer the light from the illumination source as efficiently as possible in the light path. Nevertheless, collecting light is substantially impeded by the typical packaging constraints of typical light sources such as e.g. a light emitting diodes.

In order to fulfil the high brightness requirements for many of today's applications, it is desirable to use multiple light sources, such as LED devices in order to obtain increased light output. The packaging constraints of individual light sources nevertheless pose a problem for efficiently gathering light emitted by multiple devices. In particular, the packaging of individual devices makes it is difficult to locate multiple devices closely together.

SUMMARY OF THE INVENTION

It is an object of the present invention to provide improved apparatus or methods for displaying information or images. It is an advantage of embodiments of the present invention to provide systems and methods for displaying information or images, such as projection systems and methods for projecting, having an efficient illumination. The high efficiency illumination may be illumination using one or more light sources, such as e.g. one or more light emitting diode (LED) devices. It is an advantage of systems and methods according to embodiments of the present invention that the étendue or geometrical extent of the light modulator—projection stage combination, more particularly of the at least one light modulating panel—projection lens combination, is efficiently filled by the light from the light sources, e.g. one or more LED devices. The latter may be realised in the embodiments of the present invention by a proper design of the collection system so that all of the collected light will be accepted by the one or more light modulating means such as spatial light modulating means or panels and the projection lens.

The above objective is accomplished by methods and devices according to the present invention.

The present invention relates to a display system, e.g. a projector system, for displaying an image, the display system comprising one or a plurality of light sources, a light collecting stage which comprises a separate light collecting sub-system associated with each light source, or group of light sources, at least one light modulator, e.g. a spatial light modulator, which is operable to modulate light received from the light collecting stage according to an image which is to be displayed, and, a projection stage. The one or a plurality of light sources may be a plurality of light sources. The latter is advantageous to obtain a high brightness. The at least one light modulator e.g. a spatial light modulator, may be one light modulator e.g. one spatial light modulator, or more light modulators e.g. two or more spatial light modulators.

The light sources may be light emitting diodes (LEDs). The one or a plurality of light sources may comprise a packaging such that a light emitting surface of each of said plurality of light sources can not be placed adjacent. The light collecting stage which comprises a separate light collecting sub-system associated with each light source, or group of light sources may be a system to combine the light from different light sources, e.g. LED devices. A single light collecting sub-system may be present or at least two light collecting sub-systems may be present. The latter allows to optimally combine light from different light sources or different groups of light sources.

It is an advantage of embodiments of the present invention that the light combining sub-systems of a light combining stage are such that étendue contributions of the different light sources, i.e. in the different light combining sub-systems, are adjacent to each other in a first plane, i.e. without leaving gaps and/or that in a second plane étendue contributions coincide. By way of example, spatial étendue contributions may be adjacent in a first plane and angular étendue contributions may coincide in a second plane or vice versa.

It is an advantage of embodiments of the present invention that, for light collecting subsystems using light pipes, the entrance side and the exit side of the light pipes may be congruent.

Corresponding elements within each of the light collecting sub-systems may be substantially aligned with one another. The system may optionally comprise a polarisation recuperation system (PRS).

The system may optionally comprise an additional light homogenisation and imaging system.

Each of the light collecting sub-systems may have an optical axis and the optical axes of said of light collecting sub-systems are preferably substantially parallel with one another. The optical axis may pass through centre-points of the components within the light collecting sub-system.

The light collecting sub-systems may comprise at least one lens, wherein a magnification factor of said lens is sufficient to generate an image (I) bigger than the physical outlines of the components in the light collecting sub-system.

Each light collecting sub-system may comprise an optical element which is mounted on, or directly adjacent to, the light source or group of light sources.

Each light collecting sub-system may be operable to illuminate a different portion of an overall surface area of the light modulator.

Each of the light collecting sub-systems may comprise a first lens having an aperture A which collects light emitted from one of said one or a plurality of individual light source, or a group of said one or a plurality of light sources, and forms an image (I) at a surface (S) spaced from the first lens, and a second lens positioned substantially at the surface (S) which images the aperture (A) at infinity.

A polarisation recuperation system may be positioned between the second lens and the light modulator, with the surface (S) being located at an entrance of the polarisation recuperation system.

Each light collecting sub-system may comprise a first lens having an aperture (A) which collects light emitted from an individual light source, or group of light sources, and forms an image (I) at infinity, the display system further comprising a second lens positioned between the light collecting sub-systems and the light modulator which forms a combined image at a surface (S).

The light collecting sub-systems may be arranged such that the first lenses substantially touch one another.

A Polarisation Recuperation System may be positioned between the light collecting sub-systems and the second lens.

Each light collecting sub-system may comprise a first lens having an aperture (A) which collects light emitted from an individual light source, or group of light sources and forms an image (I) at a surface (S) spaced from the first lens, and a second lens positioned substantially at a surface (S) which images the aperture (A) at infinity.

The display system may further comprise a third lens positioned between the light collecting sub-systems and the light modulator which forms a combined image at a surface (S). A Polarisation Recuperation System may be positioned between the light collecting sub-systems and the third lens.

Each light collecting sub-system may comprise a light pipe which extends from the light source. The light pipe may be outwardly tapered in the direction extending from the light source. All walls of the light pipe may be substantially straight. With a wall being substantially straight there is meant it is substantially lying in one plane. At least a portion of the light pipe nearest to the light source may have a reflective coating.

Each light collecting sub-system further may comprise a lens at the exit of the light pipe.

The light modulator, e.g. spatial light modulator, may comprise one or more light modulating panels, e.g. spatial light modulating panels. These light modulating panels may be pixelated, i.e. comprise a number of pixels that can modulate the incident light. The pixels are preferably individually adressable or addressable in groups. The light modulating panels may be for example one or more Liquid Crystal Display (LCD), Liquid Crystal on Silicon (LCOS) or Digital Light Processing (DLP) panels or chips.

The system may be a monochromatic system or may be a multi-colour system. The system may comprise an optional colour recombination system e.g. for recombining the colour beams in a single light beam.

The projection stage may comprise a projection lens.

The order of the different optical components may be varying in the different embodiments according to the present invention.

The present invention also relates to a method for displaying an image, the method comprising generating light using a plurality of light sources, collecting the light by collecting individually light from a light source or from a number of groups of light sources from said plurality of light sources, imaging the collected light on a light modulator e.g. a spatial light modulator, modulating the light according to image information to be displayed, and projecting the modulated light. Collecting the light may be done by collecting the light using light paths that are substantially parallel. The light path thus may be non-folded In other words, at least some of the embodiments of the present invention have the advantage of increasing the amount of light, generated in the light sources e.g. LED devices, that can be accepted by the imaging optics of the projector. The imaging optics typically include a light modulator e.g. a spatial light modulator, and a projection stage. The light modulator may comprise one or more light modulating panels and the projection stage typically may comprise a projection lens having a certain F-number.

Particular and preferred aspects of the invention are set out in the accompanying independent and dependent claims. Features from the dependent claims may be combined with features of the independent claims and with features of other dependent claims as appropriate and not merely as explicitly set out in the claims.

The teachings of the present invention permit the design of improved methods and apparatus for displaying images. The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

In the different figures, the same reference signs refer to the same or analogous elements.

DEFINITIONS

The following terms are provided solely to aid in the understanding of the invention. These definitions should not be construed to have a scope less than understood by a person of ordinary skill in the art.

With étendue or geometrical extent of an optical or electro-optical component there is meant the product of the area of a light beam perpendicular to its direction of propagation that can be transferred in a component and the solid angle of the beam that can be transferred. In approximation, the meaning for étendue may be derived from a definition for the total light flux of the light being the étendue multiplied with the light density in this étendue. It can be interpreted as a measure of the physical dimensions of the spatial and angular domain where the light is present. The F-number, also referred to as f-number or focal ratio, expresses the diameter of the diaphragm/aperture in units of the effective focal length of the lens.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Figure 1:
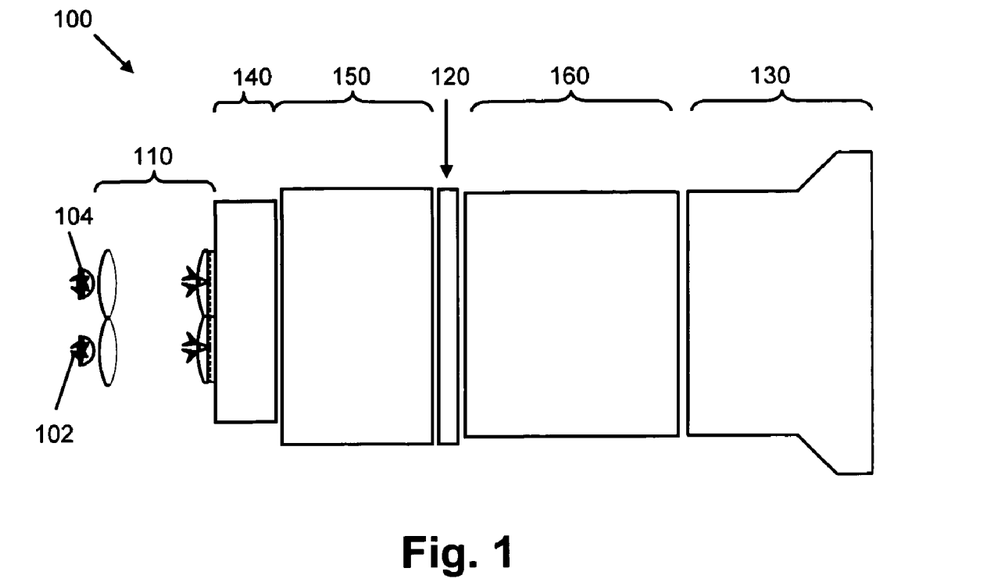
FIG. 1 shows an example of a display system with multiple light sources and a light collecting stage according to a first embodiment of the present invention.

In a first embodiment, the present invention relates to a display system, e.g. projection system for displaying an image. An example of such a display system according to the first embodiment is shown in FIG. 1 and some parts in more detail in FIG. 2. The display system 100 comprises one or more individual light sources 102 and a light collecting stage 110 comprising a separate light collecting sub-system associated with each individual light source 102 or group of individual light sources 102. The display system furthermore comprises at least one light modulator 120, e.g. a spatial light modulator, such as a light valve panel, which is operable to modulate light received from the light collecting stage 110 and a projection stage 130. Optionally other components such as e.g. a polarisation recuperation system 140, a light homogenisation and imaging system 150 and, if a number of color channels need to be combined, a colour recombination system 160 may be present. The specific order to the different components shown in FIG. 1 is illustrative and may be different in other examples and embodiments of the present invention.

Figure 2:
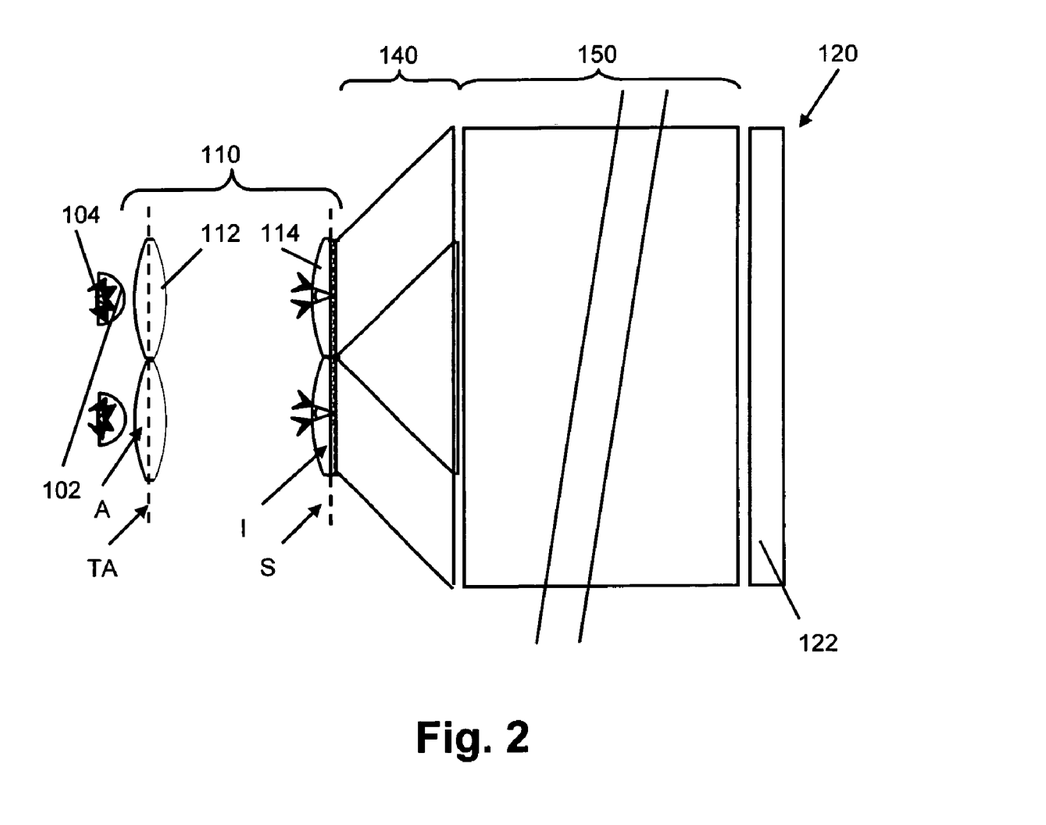
FIG. 2 shows a more detailed view of the light sources and light collecting stage of the display system as shown in FIG. 1.

The different components will now be described in more detail. The individual light sources 102 present in the display system typically may be light sources 102 that cannot be physically placed adjacent to each other because of the packaging around the light emitting surface of the light source 102 or because of the presence of other bigger optical components onto or close to the light emitting surface. The light sources 102 may e.g. be light emitting diodes (LEDs) whereby the light emitting surface typically is incorporated on a die which is packaged or where optical components bigger than the die are on to or close to the die. Each light source 102, e.g. light emitting diode (LED), can have a single light generating surface, e.g. die, or can have a group of separate light generating surfaces, e.g. dies, that are positioned very close to each other so that they can be handled as a single light generating object or as a single light emitting surface. Nevertheless, the invention is not limited to the use of light emitting diode (LED) devices. The invention also may be used with other light sources, e.g. light sources that cannot be physically placed adjacent to each other. As an optional feature, for each light source 102, one or more optical elements 104 may be placed on, or close to, the light emitting surface, e.g. die or dies, of the light sources 102. The optical element 104 may for example be a half-dome lens, or an aspheric element, but it will be understood that other types of lenses also may be suitable. The one or more optical elements 104 typically are provided by a light source 102 manufacturer, such as e.g. a LED manufacturer, in order to optimise light out-coupling from the light sources 102, especially in general lighting applications. The optical element 104 typically has a larger refractive index than air, so that more light rays will escape from the light emitting surface, and the optical element 104 typically also has a curved surface, so that these light rays exit with a less oblique angle from the element, i.e. a smaller angle with respect to the perpendicular on the light emitting surface, so that they are not internally reflected. In other words, more light may be coupled out, and because of the lens operation also the étendue may be augmented. The later may be understood as due to the lens operation the light emitting surface is transferred to an enlarged virtual light emitting surface. Typically such one or more optical elements 104 may be present on the light sources 102 and cannot be easily removed.

In the present embodiment, the light collecting stage 110, comprising a separate light collecting sub-system associated with each individual light source 102 or group of individual light sources 102, preferably comprises, for each light source 102, a first lens 112 that images the light emitting surface of the light source 102, e.g. the die or dies of a LED, or a virtual image thereof thus becoming the virtual object for first lens 112, on a surface S, forming an image I per light source 102. This first lens element 112 differs from the optional optical element 104 that might be provided. The first lens element 112 defines the aperture A of the light collecting system 110 for the light source 102, e.g. LED, to which the first lens element 112 is linked. The first lenses 112 can be spherical or aspherical lenses. These first lenses 112 preferably have a small F-number, being the ratio of the focal length of a lens or lens system to the effective diameter of its aperture, in order to collect as much as possible of the light emitted by the light sources 102, e.g. LEDs. The light collecting stage 110 furthermore preferably comprises, for each light source 102, a second lens 114 that substantially images the aperture A for that light source 102 at infinity. The second lens 114 also substantially differs from the one or more optical elements 104. The second lens 114 typically may be placed substantially at the location of the image I formed by the first lens 112.

The arrangement of the light sources 102, e.g. LEDs, the optional optical elements 104, and the lenses 112 and 114 preferably may be such that the images I of the light emitting surfaces of the light sources 102, e.g. of the dies of the LEDs, will be positioned substantially adjacent to each other on the surface S, and that the apertures of these sub-imaging systems are coinciding. Such an arrangement can be obtained in a number of ways, one thereof described in more detail by way of illustration, but without excluding a number of other methods that can realise the same result from the invention.

The optical components are arranged such that the optical axes of the different sub-systems, comprising a light source 102 or a group of light sources 102, optional optical elements 104 and a light collection sub-systems comprising a first lens 112 and a second lens 114, are aligned substantially parallel to each other. Furthermore, the optical components of each sub-system are placed in such a way that the images I and apertures A lay on their intended positions on the light path, as described above. The optical components thus are arranged so that the accepted light cones of each light source 102, e.g. LED, are transformed to parallel cones.

The optical components being light sources 102, e.g. LEDs, the optional optical elements 104 and first lenses 112 and second lenses 114 of the subsystems are arranged so that the optical axes run through their centre points, i.e. through the centre points of the optical components.

The magnification factor to obtain the image I from the light emitting surface of each light source 102, e.g. the die or group of dies of the LED, is chosen so that the image is bigger than the physical outlines of all the components that are in the optical path including their packaging, holders, wiring, etc., otherwise it is not possible to make the different images of the dies adjacent, i.e. without any gap. If component outlines, e.g. outlines of packaging, holders, wiring, belonging to one sub-system are interfering with the optical paths of a neighbouring sub-system, then the sub-systems will have to be shifted away from each other. This makes "gaps" in the compound image plane formed by all images I. These "gaps" have no illumination and will decrease the average light output that is accepted by the light valve and the projection lens combination (étendue). In other words, the absence of gaps in the image plane allow that substantially as much light as possible that is guided in the different sub-systems of the light collecting stage 110 is accepted by the at least one light modulator 120, e.g. a spatial light modulator, and the projection stage 130 such that there is no substantially loss in étendue between the light collecting stage 110 and the light modulator 120 and/or projection stage 130. Preferably there is preservation of étendue between the light collecting stage 110 and the at least one light modulator 120 and/or projection stage Another possible solution to avoid blocking of light by components of neighbouring sub-systems and consequently to avoid substantial loss in étendue between the light collecting stage 110 and the at least one light modulator 120 and the projection stage 130 is to fold the light paths emanating from the different sub-systems away from each other. Although it is preferred to combine light from multiple light sources 102, such as e.g. LED devices, the system 100 can be used with only a single light source 102, e.g. one LED device, i.e. without the combination of light from different light sources, e.g. LED devices.

In a particular example of the set-up according to embodiments of the present invention, the light collection will happen with a preservation of the étendue of the LED or LED combination in the light collecting stage 110 and with a good match to the étendue of the rest of the system 100, such as e.g. of the at least one light modulator 120 and/or the projection stage 130. This may be realised by following the rules about the placement and imaging capacities of the different optical elements as described.

In a preferred set-up of the present embodiment, the light sources 102, the optional optical elements 104 if present and the light collecting system 110 thus is arranged such that the images I of each of the light sources 102 at surface S spatially are substantially different, i.e. that the images I of each of the light sources 102 spatially substantially are located in different areas of surface S and that the images I constitute the full image of the surface S, i.e.

total image=Σ images I of the lights sources 102 and that for the aperture A of each different sub-system corresponding to a light source the apertures are the same and equal, for each two light sources 102a, 102b:

$$A_{light\ source\ 102a} = A_{light\ source\ 102b}.$$

As described above, the display system 100 of the first embodiment of the present invention comprises at least one light modulator 120 such as a light modulating panel 122. Such light modulating panels 122 may be spatial light modulators. The light modulating panels 122 may be light valves. The light modulating panels 122 may be liquid crystal devices (LCD), liquid crystal on silicon (LCOS) devices, digital light processing (DLP) devices such as digital mirror devices (DMD), or may be based on another technology. The light modulating panels 122 can be of the transmissive type or reflective type. As is well-known, such light modulating panels 122 may comprise an array of individually addressable pixels which each act as a light valve, allowing light to either block the light by absorbing it or by reflecting it out of the further light path or to be transmitted or reflected in that part of the overall picture. The state of each pixel is set to provide the desired light (colour) content for that pixel of the image that is to be displayed. For a monochrome projector only a single light modulator with a light modulating panel 122 is required. For a colour projector it is possible to either use one panel per colour, e.g. for red, green and blue, with the panels arranged in parallel with one another, e.g. in the different light paths of the differently coloured light beams, or to use a single panel which is sequentially used for red, green and blue, e.g. for time-sequential colour illumination or to use white light illumination of a single light modulating panel whereby colour filters are applied to the single light modulating panel. These techniques are well known to a person skilled in the art.

Typically, in a system with a multiple panel projection system, the light modulators 120 comprising light modulating panels 122 may be each illuminated with a color, for example a red light beam, a green light beam and a blue light beam in a 3 panel projection system such that a red, green and blue colour light channel is present. The light sources 102 and the light collecting stage 110 and the light modulating panel 122 then may be provided in the 3 different color channels and the coloured light modulated by the light modulating panels 122 then are recombined in a colour recombination system 160. Thus an optional colour recombination system 160 may be included to recombine light from the different colour channels in a single light beam. In such a colour recombination system 160, the images are recombined with one or more optical recombination components 162, before the light is sent through the projection stage 130. An example of such an optical recombination component is an X-cube, which e.g. typically is used in liquid crystal device projectors. In a system with a single panel projector wherein time sequential colour illumination is applied, the multiple colour light beams may be recombined in a colour recombination system 160 before the illumination of the panel. The multiple colour light beams then may be recombined time sequentially in a single light beam. This can be realised by placing the recombination optics, i.e. the one or more optical recombination components 162, for example an X-cube, in the light path upstream the surface S. The latter may be done e.g. for recombining 3 or more primary colours, e.g. red, green and blue. In this case the optical axes of the subsystems of at least one of the colours typically will be folded in the one or more optical recombination components 162.

The recombined light finally typically is passed through a projection stage 130 comprising a projection lens 132 which images the light from the single or multiple light modulating panels 122 to a projection screen (not shown in FIG. 1).

Figure 3:
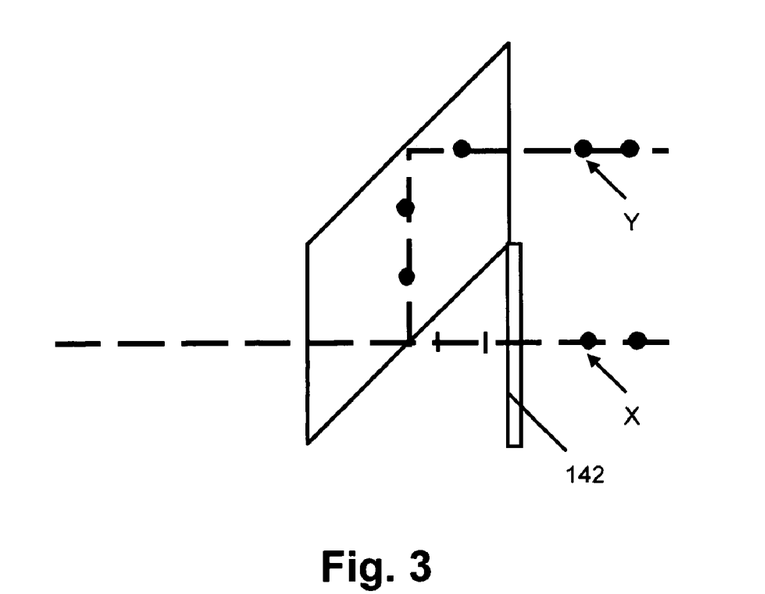
FIG. 3 shows a schematic representation of a polarisation recovery system as can optionally be used in a display systems according to different embodiments of the present invention.

In display systems 100 according to the first embodiment it is advantageous, although not essential, to use a polarisation recuperation system (PRS) 140 as shown in FIG. 1. The use of a PRS 140 is known, for example, from various LCD projector designs where arc lamps are used as light source. It will now be described how a PRS 140 can be used with a projector using a light source like e.g. a LED light source. As shown in FIG. 3, an example PRS 140 splits the light falling on its entrance surface into two differently polarised components, i.e. into two light components having a different polarisation state. The latter may be two orthogonally polarised components. The differently polarised components typically follow different lightpaths X and Y. The latter may e.g. be performed using a polarisation beam splitter (PBS), but other implementations can also be possible. The PRS can split the total light bundle as a whole, or be divided in a number of subelements that each split a part of the light bundle. In one of the light paths, by way of example light path X of FIG. 3, a polarisation conversion element 142, e.g. a halfwave retarder, is placed that converts the polarisation state of the incident component in the polarisation state of the differently polarised component following the other light path Y. For orthogonally polarised components the polarisation thus is changed from a first polarisation state in its orthogonal polarisation state. In this way, the polarisation state of the light component following the first path is substantially equal to the polarisation state of the light following the other light path, i.e. light path Y in the example of FIG. 3. A polarisation recovery system 140 is preferably used in combination with a light modulator that use polarized light, such as most light modulators comprising LCDs and LCOS devices, and recuperates the light that has the wrong polarisation at the cost of a substantially doubling of the étendue of the illumination system. In the present embodiment, the images I from the different light sources 102 are arranged in such a way that they fall on the entrance surface of the PRS 140. Because of the division into two light paths, the total exit surface for the PRS 140 will, in a best case, be substantially doubled compared to the total of all S surfaces. The latter can be used advantageously by arranging the images I at the entrance of the PRS 140 such that there are empty spaces in between them. These empty spaces then can be filled up by polarisation converted images split off in the PRS 140, i.e. the light following light path Y. The latter may allow that light sources 102 and optical components in the sub-systems of the light collecting stage 110 are placed further away from each other, such that in general there is less chance that optical components are obstructing neighbouring sub-systems. The latter thus eases the restrictions on the alignment of the multiple subsystems described above because more space is available. As a consequence it is possible that the light sources 102, e.g. LED devices, and other optical devices can be placed more distantly with respect to each other, or in other words that the optical subsystems can be placed farther away from each other, thus facilitates the use of e.g. bigger lenses that collect more light from the light sources 102, e.g. LEDs.

In display systems 100 according to the first embodiment it is advantageous, although not essential, to use an additional light homogenisation and imaging system 150, shown in FIG. 1. The purpose of this system is to transport to the at least one light modulator 120 the total set of images I on the surface S or the total set of images at the exit surface of a polarisation recuperation system 140 if the latter is used between the light collecting stage 110 and the light homogenisation and imaging system 150. The light homogenisation and imaging system 150 furthermore may homogenise the light beam or in other words make the light beam more uniform. There are a number of ways of implementing this stage, examples thereof being shown in the non-restrictive list below:

- The imaging and homogenisation system 150 may comprise a small propagation through air or glass, so that the at least one light modulator 120 is illuminated substantially directly. In this case it should be noted that if the light of a number of light sources 102 is combined, that small mismatches of the alignment of the images I, initial light output differences or color differences on the light emitting surface of the light sources 102 or differential aging of the light emitting surface of the light sources can lead to visible non-uniformities in the image because no substantial homogenisation is performed. On a short distance the light from different areas from the illuminated surface is not mixed significantly. If one light source would fail, this thus would result in a failure of a part of the image. With homogenisation over the whole image the latter would not be the case.
- The imaging and homogenisation system 150 may comprise a light pipe wherein the light is entered. The light pipe can be straight or can be tapered. In the case of a tapered light pipe, it is preferred that an extra lens is used at the entrance and exit of the light pipe.
- The imaging and homogenisation system 150 may comprise relay optics that can be used to image the surface where the light is combined onto the panel. This technique can e.g. be used when the light modulating panels 122 are of the reflective type, i.e. where it is impossible to put such a reflective light modulating panel 122 directly at the exit of a light pipe.
- The imaging and homogenisation system 150 may comprise a set of fly eye lens array integrators.
- The imaging and homogenisation system 150 may comprise a combination of the above described features.

There should be a good match between the input and exit surfaces and input and exit acceptance angles of the imaging and homogenisation system 150 so that this stage is well matched to the previous stage, e.g. the light collecting stage 110 or polarisation recuperation stage 160, and the next stage, e.g. the at least one light modulator 120.

Figure 4:
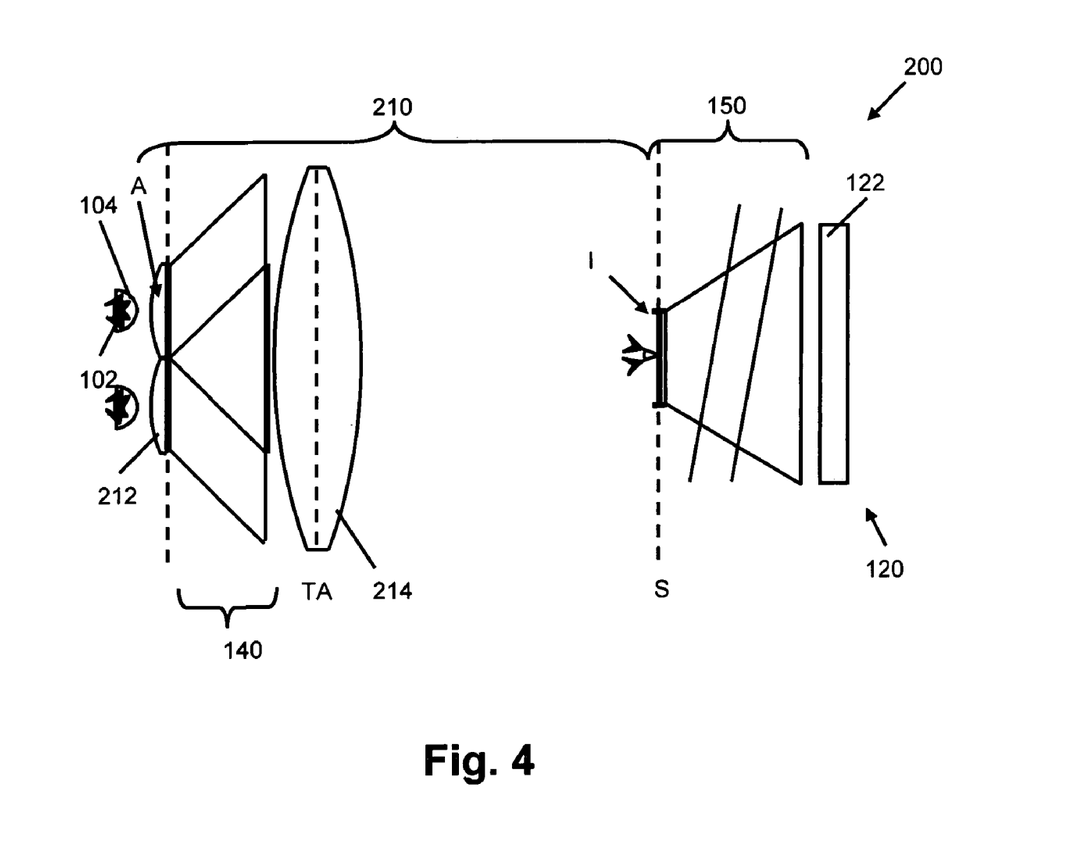
FIG. 4 shows an example of a display system with multiple light sources and a light collecting stage according to a second embodiment of the present invention.

In a second embodiment, the present invention relates to a display system 200 comprising substantially the same components and having substantially the same properties and advantages as described in the first embodiment, but wherein the light collecting stage 210 typically is built up differently. Part of an example display system 200 according to the second embodiment of the present invention is schematically shown in FIG. 4. The light sources 102 which perform the light generation and the optional optical elements 104 are the same and have the same properties and advantages as the light sources 102 described in the first embodiment. The light collecting stage 210 preferably comprises, for each light source 102, e.g. for each LED device, a first lens 212 imaging the light emitting surface of the light sources 102, e.g. the die or group dies of LED devices comprising the light emitting surface, or the virtual image of the light emitting surface made by the optional optical elements 104, thus forming an image I per light source at infinity. Each of the first lenses 212, e.g. adjacent square lens elements, defines the aperture A of the light collecting system for the light source 102 to which it is linked. These first lenses 212 can be spherical or aspherical lenses. The first lenses 212, which are different from the optional optical elements 104, are preferably high speed lenses which collect as much as possible of the light emitted by the light sources 102, e.g. LEDs. The form of the second lens 212 preferably is such that they touch each other. The total aperture TA is the combination of all sub-apertures A, i.e. apertures A of the sub-systems of the light collecting system for each of the light sources 102. Preferably, the total aperture TA is completely illuminated, with substantially no non-illuminated parts.

In the present embodiment, preferably the light sources 102, the optional optical elements 104 if present and the first lenses 212 are arranged in such a way that the apertures A will be put adjacent to each other, and that the images I of these sub-imaging systems are coinciding at infinity. Such an arrangement can be obtained in a number of ways, one thereof described in more detail by way of illustration, but without excluding a number of other methods that can realised the same result from the invention.

- The optical components are arranged such that the optical axes of the subsystems comprising, e.g. consisting of, a light source 102 or a group of light sources 102, optional optical elements 104 if present, and a light collecting subsystem comprising a first lens 212, are aligned and substantially parallel to each other.
- The optical components being the light sources 102, e.g. LEDs, the optional optical elements 104 if present, and the first lenses 212 of the subsystems are arranged so that the optical axes run through their centre points, i.e. through the centre points of the optical components.

In the present embodiment, the light collecting system 210 preferably comprises a second lens 214, e.g. positioned after the optional polarisation recuperation system 140, preferably may be used to transport the images from the light generation surface of the light sources 102 from infinity to a real surface S, where the images coincide. Such a surface S may be used as an input for at least one light modulator 120, an optional light homogenisation and imaging system 150 and/or an optional colour recombination system 160. These components, together with the projection stage 130, are the same as described in the first embodiment and have the same properties and the same advantages. By way of example, FIG. 4 illustrates a display system whereby a tapered light pipe as optional light homogenisation and imaging system 150 is used. The light pipe typically is longer than shown in the drawing, as also indicated by the two lines crossing the light pipe.

The light sources 102, the optional optical elements 104 if present and the light collecting system 210 thus are arranged such that the images I of each of the light sources 102 at surface S all are equal, i.e. for each two light sources 102a, 102b $$I_{light\ source\ 102a} = I_{light\ source\ 102b}$$

and that the apertures A of the different sub-systems for the different light sources 102 together form the total aperture TA for the rest of the system Total aperture TA=Σ apertures A of the sub-systems.

It is to be noticed that the illumination from the surface S has substantially the same aspect ratio as the light generation surface of the light sources 102, for instance this could be square or another example is the aspect ratio of 3 by 2 as sometimes present in LEDs. If the aspect ratio of the surface S is different from the aspect ratio of the light modulating panel 122 used in the at least one light modulator 120, an optional light homogenisation and imaging system 150 may be adapted to correct therefore, e.g. using a tapered light pipe where the input and output surface have a different aspect ratio. The input surface then may have the aspect ratio of the illuminated part of the surface S, whereas the output surface may have an aspect ratio similar to the at least one light modulating panel 122.

In a preferred embodiment, an optional polarisation recuperation system is used, the optional polarisation recuperation system 140 comprising the same properties and advantages as described in the first embodiment of the present invention. The apertures A of the subsystems then can be duplicated and may define a total aperture TA after the optional polarisation recuperation system 140, which then is the valid aperture for the remaining part of the projection system.

It is an advantage of display systems according to the present embodiment that all light sources 102 substantially illuminate the full spatial area of the light modulator. The latter may e.g. be advantageous if one of the light sources drops out or changes its emission characteristic substantially, as the effects will be spread over the full light modulator and thus may be less visible in the resulting image displayed on a screen.

Figure 5:
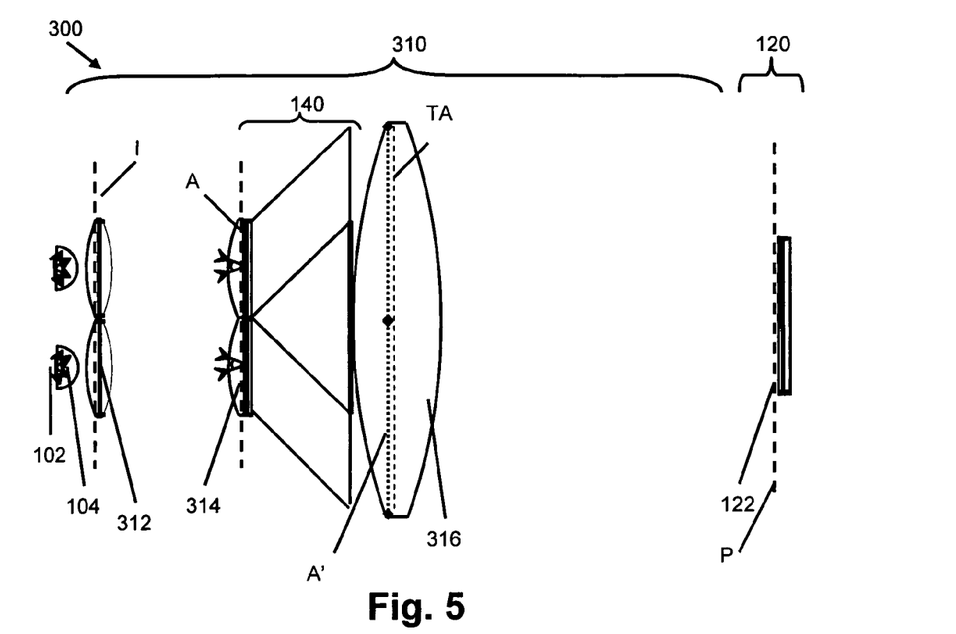
FIG. 5 shows an example of a display system with multiple light sources and a light collecting system according to a third embodiment of the present invention.

A third embodiment according to the present invention relates to a display system 300 comprising substantially the same components and having substantially the same properties and advantages as described in the first embodiment, but wherein the light collecting stage 310 typically is built up differently. An example display system 300 according to this embodiment is shown in FIG. 5a and FIG. 5b. The light sources 102 which perform the light generation and, if present, the optional optical elements 104 are the same and have the same properties and advantages as the light sources 102 respectively the optional optical elements 104 described in the first embodiment. The light collecting stage 310 preferably comprises, for each light source 102, e.g. for each LED device, a first lens 312 imaging the light emitting surface of the light sources 102, e.g. the die or group dies of LED devices comprising the light emitting surface, or the virtual image of the light emitting surface made by the optional optical elements 104, forming an image I per light source 102. The first lenses 312 create images of the different light sources 102, e.g. LEDs, that are positioned substantially adjacent to each other. The first lens 312 defines the object of the light modulating panel for the light collecting system for the light source 102, e.g. LED device, to which it is linked. Each of the first lenses 312, e.g. rectangularly shaped lens elements, may be spherical or a spherical. They preferably have a small F-number to collect as much as possible the light of the light sources 102, e.g. LEDs. Per light source 102, e.g. LED device, a second lens 314 is provided that images the lens 312 at infinity, and which is placed substantially at the location of the image I. So all images of the lenses 312 are superimposed at infinity, where they coincide. This object will be imaged by a third lens 316 on surface P. Each of these second lenses 314, e.g. adjacent square lens elements, define a part A of the aperture of the light collecting system for the light source 102, e.g. LED device, to which it is linked.

In the present embodiment, preferably the light sources 102, the optional optical elements 104 if present and the first lenses 312 and 314 are arranged in such a way that the apertures A will be put adjacent to each other, and that the images I of these sub-imaging systems are coinciding at infinity. Such an arrangement can be obtained in a number of ways, one thereof described in more detail by way of illustration, but without excluding a number of other methods that can realise the same result:

The optical components are arranged such that the optical axes of the subsystems comprising, e.g. consisting of, a light source 102 or a group of light sources 102, optional optical elements 104 if present, and a light collecting subsystem comprising a first lens 312 and a second lens 314, are aligned and substantially parallel to each other.

The optical components being the light sources 102, e.g. LEDs, the optional optical elements 104 if present, and the first lenses 312 and second lenses 314 of the subsystems are arranged so that the optical axes run through their centre points, i.e. through the centre points of the optical components.

Figure 6:
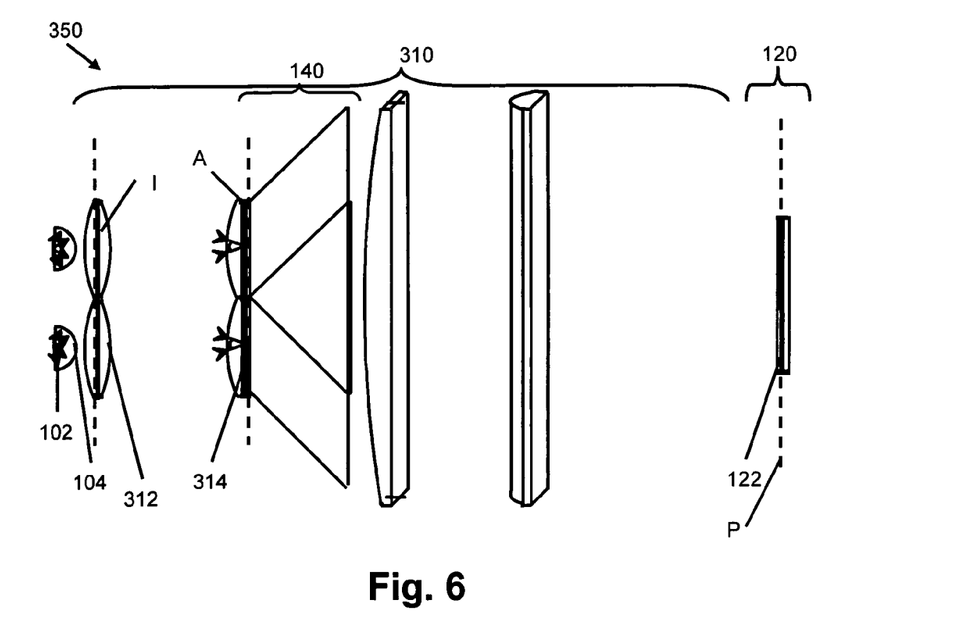
FIG. 6 shows an example of a display system with multiple light sources and an alternative light collecting system according to the third embodiment of the present invention.

In the present embodiment, the light collecting means preferably comprises a third lens 316 which images each first lens 312 on a surface P, where they coincide. The focal point of the third lens 316 lays substantially on surface P. If the first lens 312 has the same aspect ratio as the at least one light modulator 120, then optionally a light homogenisation and imaging system 150 as described in the first embodiment may be used, although the invention is not limited thereto, wherein the same aspect/ratio is kept between the entrance and the exit of the light homogenisation and imaging system 150. If the first lens 312 has a different aspect ratio than the at least one light modulator 120, then a tapered light pipe, e.g. provided with lens, can be placed with the entrance in position P, to correct for the difference in aspect ratio. It is also possible to split the third lens 316 into 2 cylinder lenses to correct for the aspect ratio, as shown in display system 350 of FIG. 6. The lenses are placed in such a way, that their focal point coincide, and that they lay on surface P. Again optionally a light homogenisation and imaging system 150 as described in the first embodiment can be used to illuminate the at least one light modulator 120.

The light sources 102, the optional optical elements 104 if present and the light collecting system 310 thus preferably may be arranged such that the images I of each of the light sources 102 at surface P all are equal, i.e. for each two light sources 102a, 102b $$I_{\text{light source }102a} = I_{\text{light source }102b}$$

and that the apertures A of the different sub-systems for the different light sources 102 together form the total aperture TA for the rest of the system Total aperture TA=Σ apertures A of the sub-systems or part of it.

In a preferred set-up of the present invention, an optional polarisation recuperation system 140 may be applied as described in more detail for the first embodiment of the present invention. The polarisation recuperation system 140 will substantially double the apertures A of the different sub-systems of the light collecting system to apertures A' of the different sub-systems of the light collecting system, which are substantially adjacent, and thus form the total aperture TA of the rest of the display system 300. The optical components such as the polarisation recuperation system 140 should be arranged in such a way that the duplicated apertures A', corresponding to the original apertures A are positioned in such a way that they are also adjacent to other original or duplicate apertures, so that the total aperture TA has substantially no non-illuminated parts. Other components such as the at least one light modulator 120, the projection stage 130 and the optional colour recombination system 160 may be the same as described in the first embodiment, comprising the same properties and having the same advantages.

Figure 7A:
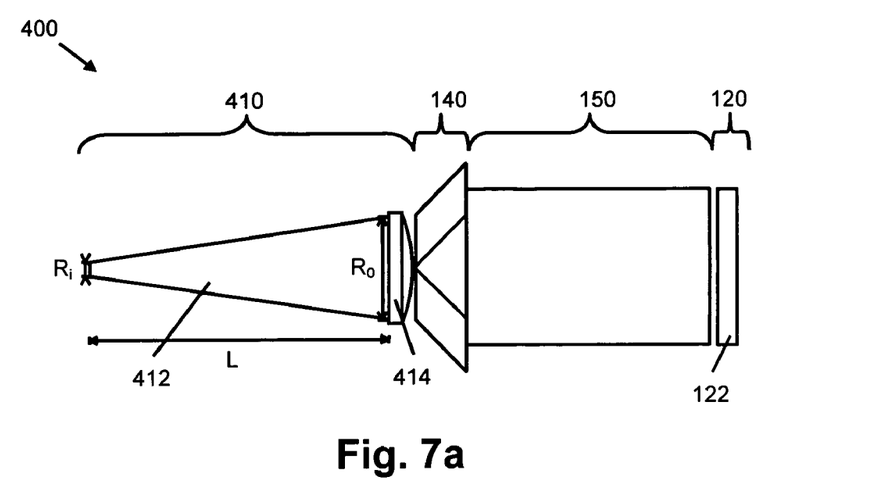
FIG. 7a and FIG. 7b show a schematic representation side view (FIG. 7a) respectively top view (FIG. 7b) of a display system with multiple light source and an light collecting system according to a fourth embodiment of the present invention.
Figure 7B:
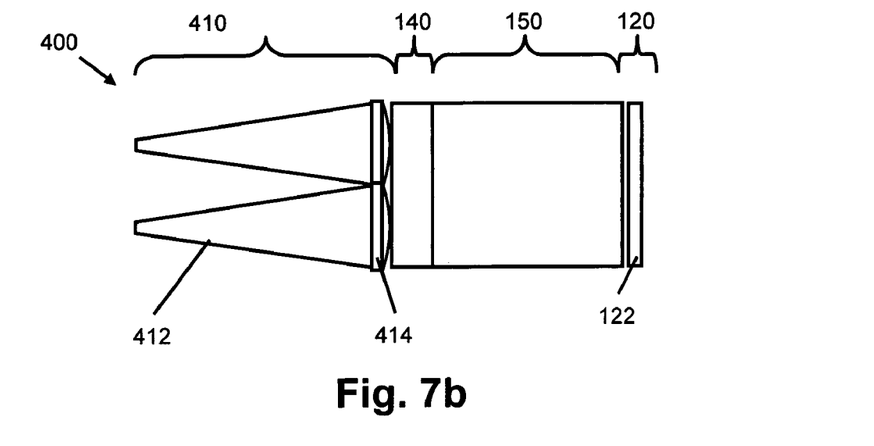

In a fourth embodiment, the present invention relates to a display system 400 comprising substantially the same components and having substantially the same properties and advantages as described in the first embodiment, but wherein the light collecting stage 410 typically is built up differently. Part of an example display system 400 according to the fourth embodiment of the present invention is shown in FIG. 7a and FIG. 7b. The light sources 102 which perform the light generation are the same and have the same properties and advantages as the light sources 102 described in the first embodiment. Although optional optical elements 104 are not excluded, the latter typically are absent. In some cases, a thin protective layer may be present on the light emitting surface.

The light collecting stage 410 preferably comprises, for each light source 102, e.g. for each LED device, a light pipe 412, e.g. a tapered solid light pipe of a transparent material, that is optically coupled to the light emitting surface of the light sources 102 or to a coating thereon, e.g. a thin protective layer. The light pipes 412 ideally have the following characteristics in order to avoid the loss of light, thus allowing to couple substantially all light onto the at least one light modulator 120;

The input and output surface of the light pipe 412 are substantially parallel to each other and have substantially the same aspect ratio.

In order to avoid loss of light that can be coupled into the system, the input surface of the light pipe 412 should have the substantially same dimensions of the outline of the light emitting surface of the light source 102, e.g. substantially the same dimensions of the outline of the single light generating die or the group of light generating dies on the LED device.

The side surfaces of the light pipe 412 may be substantially straight and flat.

Optionally a first part of the light pipe 212 is covered with a highly reflective coating or film. The reason for this reflective coating or film is that light exits the light pipe because it is not internally reflected due to the large incident angles, and that this coating or film will reflect this light back into the light pipe. This reflective coating or film is no longer required in the second part of the light pipe because there the incident angles have gradually decreased due to the effect of the tapering of the light pipe.

Per light source, the light collecting system 410 also comprises a first lens 414 at the exit of the light pipe 412, put close to the light pipe 412 or glued on the light pipe 412 preferably with index matching glue. The lens may have a focal distance chosen so that the axes of the light cones from every point on the exit surface of the lens are substantially parallel. For the definition of this lens the following formula can be used:

$$f = \frac{L}{n} \frac{R_0 + R_i}{R_0}$$

in which f represents the focal length of the first lens 414, n the refractive index, $R_0$ the largest dimension on the output surface of the light pipe 412 and $R_i$ the largest dimension on the input surface of the light pipe 412.

In a preferred set-up of the present embodiment of the present invention, the light emitting surface of the light sources are arranged so that the optical axes are parallel to each other and the first lenses 414 are put substantially adjacent to each other.

The arrangement of the present embodiment can be used with a single light source 102, e.g. a single light emitting diode. In that case, there is only a single light pipe 412 and first lens 414. The property of optical axes arranged parallel to each other then does not apply.

The at least one light modulator 120, the projection stage 130 and the optional colour recombination system 160 may be the same as those described in more detail in the first embodiment, comprising the same properties and the same advantages.

Figure 8:
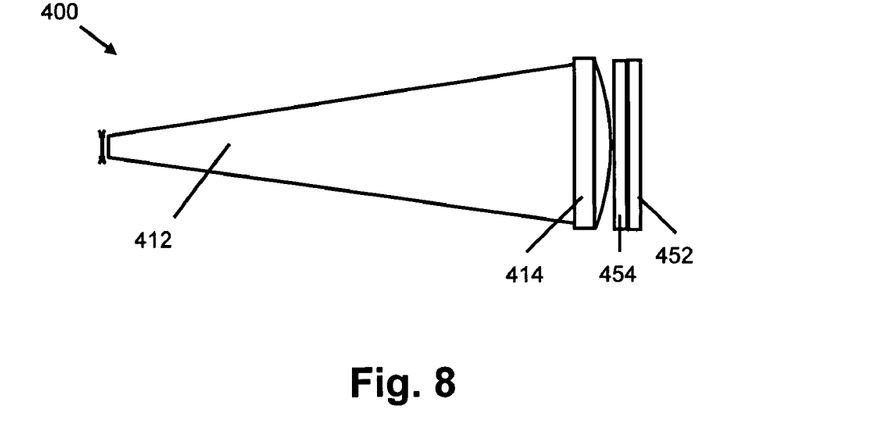
FIG. 8 shows a schematic top view of part of a display system with multiple light sources and an alternative light collecting system according to the fourth embodiment of the present invention.

An alternative arrangement of the fourth embodiment relates to a display system 450 similar as the display system 400 described above, but wherein the light collecting system 410 furthermore comprises a reflective polariser 452 and a retarding means 454. The reflective polariser 452 may e.g. be a wiregrid polariser, although the invention is not limited thereto. The reflective polariser 452 is positioned at the exit side of the light pipe 412, e.g. after the first lens 414 of the light pipe 412. Part of the display system 450 is illustrated in FIG. 8. The retarding means 454 is positioned somewhere in the light path in the light pipe 412 or at the exit side between the lens and the reflective polariser 452. The retarding means 454 may be a retarder with a retardation substantially equal to an odd times a quart wave retardation, such as e.g. a quarter-wave retarder.

Light with a polarisation state which can not be transmitted by the reflective polariser 452 will be reflected back into the light pipe 412 thus going through the retarding means 454, following the path to the light source 102, where it will be partly reflected if it falls on (partly) reflective parts of the light source 102 surface. Than this light will travel again through the light pipe towards the reflective polariser 452. There it will go a second time through the retarding means 454 and its polarisation state will be modified so that a substantial part of the light will pass through the reflective polariser 452 this time.

The reflective polariser 452 can also be a broadband cholesteric polariser. This will reflect one type of circular polarised light. Therefore, when a broadband cholesteric polariser is used, no retarding means needs to be used to achieve a second pass of the originally reflected light through the reflective polariser. In the present embodiment, there is no need for an additional polarisation recuperation system as described as optional component in the first embodiment of the present invention.

It is an advantage of display systems according to embodiments of the present invention that a maximum of the light generated in the light sources is modulated, e.g. transmitted/reflected, by the light modulator 110 and accepted by the f-number of the projection lens 132 of the projection stage 130. In other words, it is an advantage of display systems according to embodiments of the present invention that the étendue of the light modulator 110/projection stage 130 combination is fully exploited.

It is also an advantage of embodiments according to the present invention that a full exploitation of the étendue of the light modulator 110/projection stage 130 combination can be obtained for a system comprising only one light source, e.g. one LED device, e.g. per primary colour. It is also an advantage of embodiments according to the present invention that a full exploitation of the étendue of the light modulator 110/projection stage 130 combination can be obtained for a system comprising multiple light sources 102, e.g. LED devices, e.g. per primary colour, which are combined. The latter may be advantageous as high brightness systems can be more easily achieved. With display systems, e.g. projector systems, according to the present invention and with a given luminance of the light sources 102, e.g. LED devices, the light valve/projection lens combination may result in no substantial loss of étendue. The light sources 102 thereby may be such that they cannot be positioned physically adjacent to each other because of the packaging around the light emitting surface or because of the implementation of bigger optical components used near the light emitting surface.

Since the light sources 102, the at least one light modulator 120 and the projection lens 130 have a predetermined étendue, in principle the maximum amount of light sources which can be used to illuminate is predetermined. This maximum amount is determined by preservation of étendue, i.e. prohibiting that the étendue increases as this would lead to less optimal use of the light sources. The embodiments according to the present invention provide a display system with a light collecting system that allows preserving the étendue.

It is advantageous for systems with a plurality of optical subsystems that no space is present between the étendue contributions of the optical subsystems. Physical constraints, like packaging, wires, connectors, component holders, etc. can be the reason why subsystems cannot be put as close together as required for leaving no space between the étendue contributions of the optical subsystems. The present invention provides embodiments allowing to preserve the étendue. Some embodiments of the present invention therefor advantageously compose the étendue contributions of the subsystems in the spatial domain, whereas other embodiments compose the étendue contributions of the subsystems in the angular domain.

The embodiments of the present invention are especially useful when a plurality of light sources is used, e.g. when a plurality of light sources per colour channel is used, as this allows to increase the brightness.

It is to be understood that although preferred embodiments, specific constructions and configurations, as well as materials, have been discussed herein for devices according to the present invention, various changes or modifications in form and detail may be made without departing from the scope and spirit of this invention. For example, although the above embodiments are described with relation to the devices, the present invention also relates to corresponding methods for illuminating. The present invention thus provides in methods for illuminating wherein the light is guided on a light path using any of the above described optical set-ups. The present invention e.g. relates to a method for displaying an image comprising generating light with a plurality of light sources, collecting the light by collecting individually light from each of the light sources, imaging the collected light on a modulator, modulating the light according to image information to be displayed, and projecting the modulated light. Collecting the light may be done by collecting the light individually from each of the light sources using light paths that are substantially parallel. Collecting the light also may be done by collecting the light on light paths through the centre points of the optical components.

What is claimed is:

1. A display system for displaying an image comprising:
   one or a plurality of individual light sources;
   a light collecting stage which comprises a separate light collecting sub-system associated with each light source, or group of light sources;
   at least one light modulator which modulates light received from the light collecting stage according to an image which is to be displayed; and
   a projection stage
   wherein said light collecting sub-system associated with each light source, or group of light sources comprises at least one lens, wherein a magnification factor of said lens is sufficient to generate an image (I) bigger than the physical outlines of the components in the light collecting sub-system.

2. A display system according to claim 1, wherein said one or a plurality of individual light sources are a plurality of light sources.

3. A display system according to claim 1, wherein said one or a plurality of individual light sources is/are light emitting diodes.

4. A display system according to claim 1, wherein said one or a plurality of light sources comprise a packaging such that a light emitting surface of each of said plurality of light sources cannot be placed adjacent.

5. A display system according to claim 1, wherein corresponding elements within each of the light collecting sub-systems are substantially aligned with one another.

6. A display system according to claim 1, wherein each of the light collecting sub-systems has an optical axis and the optical axes of said of light collecting sub-systems are substantially parallel with one another.

7. A display system according to claim 6, wherein said optical axis passes through centre-points of the components within the light collecting sub-system.

8. A display system according to claim 1 wherein each light collecting sub-system comprises an optical element which is mounted on, or directly adjacent to, the light source or group of light sources.

9. A display system according to claim 1 wherein each light collecting sub-system comprises a lightpipe which extends from the light source.

10. A display system according to claim 9 wherein the lightpipe is outwardly tapered in the direction extending from the light source.

11. A display system according to claim 9 wherein all walls of the lightpipe are substantially straight.

12. A display system according to claim 10 wherein at least a portion of the lightpipe nearest to the light source has a reflective coating.

13. A display system according to claim 9 wherein each light collecting sub-system further comprises a lens at the exit of the lightpipe.

14. A method for displaying an image, the method comprising
   generating light using a plurality of light sources,
   collecting the light by collecting individually light from a light source or from a number of groups of light sources from said plurality of light sources,
   imaging the collected light on a light modulator,
   modulating the light according to image information to be displayed, and
   projecting the modulated light
   wherein the collecting individually light from a light source or from a number of groups of light sources is done by light collecting sub-systems, and
   wherein said light collecting sub-systems generate an image bigger than the physical outlines of the components in the light collecting sub-systems.

15. A method according to claim 14, wherein collecting the light may be done by collecting the light using light paths that are substantially parallel.

* * * * *

UNITED STATES PATENT AND TRADEMARK OFFICE
CERTIFICATE OF CORRECTION

PATENT NO.       : 7,618,147 B2  Page 1 of 1
APPLICATION NO.  : 11/289282
DATED            : November 17, 2009
INVENTOR(S)      : Defever et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 835 days.

Signed and Sealed this

Fourteenth Day of December, 2010

David J. Kappos
*Director of the United States Patent and Trademark Office*